United States Patent [19]

Hoshimi et al.

[11] 4,451,920
[45] May 29, 1984

[54] PCM SIGNAL PROCESSING APPARATUS

[75] Inventors: Susumu Hoshimi, Yokohama; Tadashi Kojima, Yokosuka, both of Japan

[73] Assignees: Sony Corporation; Tokyo Shibaura Denki Kabushiki Kaisha, both of Japan

[21] Appl. No.: 324,816

[22] Filed: Nov. 25, 1981

[30] Foreign Application Priority Data

Dec. 1, 1980 [JP] Japan .................. 55-169410

[51] Int. Cl.³ .................. G06F 11/10; G11B 5/00
[52] U.S. Cl. .................. 371/40; 360/38.1
[58] Field of Search .................. 371/38, 39, 40; 360/38.1

[56] References Cited

U.S. PATENT DOCUMENTS

| 4,206,440 | 6/1980 | Doi et al. | 371/38 |
| 4,211,997 | 7/1980 | Rudnick et al. | 371/38 |
| 4,234,896 | 11/1980 | Onishi et al. | 360/38.1 |
| 4,238,852 | 12/1980 | Iga et al. | 371/40 |
| 4,306,305 | 12/1981 | Doi et al. | 371/38 |
| 4,376,290 | 3/1983 | Shirota | 360/38.1 |
| 4,380,071 | 4/1983 | Odaka | 371/40 |

Primary Examiner—Charles E. Atkinson
Attorney, Agent, or Firm—Hill, Van Santen, Steadman & Simpson

[57] ABSTRACT

A PCM signal processing apparatus adapted to receive successive transmission blocks, each of which comprise time-interleaved PCM data, error correction and error detection words. The apparatus has detecting means responsive to the error detection words for detecting errors in a received transmission block and error identifying means for identifying errors in each of the time-interleaved words included in the received transmission block which has been detected. A de-interleaver is provided for time-deinterleaving each received transmission block to recover a de-interleaved block comprising de-interleaved PCM and error-correction words, with errors in the de-interleaved words being respectively identified. A syndrome generating device is coupled to the de-interleaver for generating error syndromes using the de-interleaved PCM and error-correction words in the de-interleaved block. An error correcting device responsive to the error syndromes corrects erroneous PCM words in the de-interleaved block as a function of the remaining error free PCM and the error-correction words in the de-interleaved block. An error compensating device is responsive to the identification of errors by the error identifying device and compensates the erroneous PCM words in the de-interleaved block with a substitute PCM word when error correction by said error correcting device is impossible. An inhibit device inhibits the error correcting device when all of the error detection words in the de-interleaved block are identified as erroneous and it discontinues inhibiting when the relationship between the identification by the error identifying device and the error syndrome indicates that no error exists.

5 Claims, 7 Drawing Figures

PCM SIGNAL PROCESSING APPARATUS

CROSS-REFERENCES TO RELATED APPLICATIONS

This application is related to copending application Ser. No. 324,815, filed Nov. 25, 1981 entitled "PCM SIGNAL PROCESSING APPARATUS" in which the inventors are Susumu Hoshimi and Tadashi Kojima assigned to the assignee of the present application.

BACKGROUND OF THE INVENTION

1. Field of the Invention

This invention relates in general to a PCM (Pulse Code Modulation) signal processing apparatus and particularly to a PCM signal processing apparatus in which an audio signal is digitized for use in a VTR (Video Tape Recorder) and a digital audio disk so as to reproduce a recorded signal which has been interleaved utilizing an error correction method.

2. Description of the Prior Art

There have been proposed PCM recording and reproducing apparatuses for modulating analog and audio signals such as music to form a PCM signal and to add error correction and error detection codes so as to form a signal configuration similar to a television signal, which can be recorded and reproduced by a VTR. In the VTR, when dropout is caused by dust or foreign matter on the magnetic tape, used as the recording medium, it is possible that a burst error will occur in the recorded PCM signal. If such burst error occurs, it becomes quite difficult to error-correct for the dropped data.

To cope with this problem the following operation is performed. In a PCM processor where an audio PCM signal is converted to a quasi-video signal, during conversion of the audio PCM signal to a video signal, i.e., during recording the PCM data is separated for each sampled word with a predetermined number of words forming one block and an error correction code is generated for such PCM data block. The PCM data and error correction codes are interleaved to have different delay times from each other and the error detection code is further added to the interleaved data, which is then converted to the video signal. When the VTR again reproduces the signal thus recorded, the video signal is converted to the audio PCM signal, and an operation which is the reverse is done for de-interleaving so as to disperse the burst errors and to correct the data. According to such an arrangement upon normal reproduction all of correction abilities are utilized so that nearly all of the original data can be reproduced.

However, when a recording VTR has not as yet been switched to a recording mode and the video signal input terminal of the VTR is directly and electrically connected to a video signal output terminal and since it is necessary to monitor the input signal thereof even when the VTR is not operating such mode identified as the E—E mode is frequently utilized. In this mode, the video signal output of the PCM processor is directly coupled to the video signal input terminal. When this mode is changed and the apparatus is switched to the reproducing mode or an edited magnetic tape is reproduced, two different mixed data may exist before and after the stage where they are de-interleaved and converted to the correct forms. In such case, since the error correcting circuit performs error correction although no error exists, the error correcting circuit produces data which is quite different from the original data at the output and when such data is supplied to and converted to an audio signal by a D/A (Digital to Analog) converter, such audio signal will produce an offensive abnormal sound and the speakers may be damaged.

In order to prevent such erroneous correction, a method has been proposed wherein the error decision is performed by employing both the error detection results using the error correction code and syndromes or indicators formed from the error correction code and the reproduced PCM data. Thus, when an error syndrome indicates the presence of an error although no error is indicated by the error detection circuit and when the syndrome indicates the existence of an erroneous word in addition to an erroneous word identified by the error indicator by the error detection circuit and where the position of the error is unknown, the error correction circuit is inhibited and all of the PCM words within the block are compensated. A front-end hold arrangement is used to interpolate the erroneous word with the correct word occurring prior to the erroneous word and a mean value interpolation is done so as to interpolate the erroneous word with the mean value between the correct words before and after such error word.

In these methods, when the burst error occurs at a connection point of the input data, such methods will only be effective if the burst error is short and if the burst error is long there will be many erroneous words in the data after deinterleaving and it becomes impossible to check whether or not the error indicator and the syndrome have a normal relationship and correction of the errors cannot be made.

SUMMARY OF THE INVENTION

It is an object of this invention to provide a new PCM signal processing apparatus which eliminates the defects of the prior art.

Another object of this invention is to provide a PCM signal processing apparatus which can positively and reliably prevent erroneous correcting operations even when a relatively long error burst occurs at a connection point between different PCM data.

According to an aspect of the present invention, there is provided a PCM signal processing apparatus which is adapted to receive successive transmitted data blocks, each of which comprise time-interleaved PCM data with error correcting and error detecting words and the apparatus comprises a detecting device responsive to the error detecting words to determine if a received transmitted data block contains an error. An error identifying device identifies errors in each of the time-interleaved words in the received transmitted data block. A de-interleaver time-deinterleaves each received transmitted data block and recovers a de-interleaved data block formed of de-interleaved PCM and error-correction words. Incorrect de-interleaved words are identified by a syndrome generating device which is coupled to the output of the de-interleaver and generates error syndrome indications from the de-interleaved PCM and the error-correction words in the de-interleaved data block. An error correcting device receives the output of the error syndrome means and corrects erroneous PCM words in the de-interleaved data block as a function of the remaining non-erroneous PCM and error-correction words in the deinterleaved data block. An error compensating device is responsive to the identification of errors by the error identifying device and compensates by replacing the erroneous PCM word in the de-interleaved data block with a substitute PCM word when error correction by the error correcting means is impossible. An inhibit device inhibits the error correcting device when all of the words in error in the de-interleaved data block are identified as erroneous and the inhibit device discontinues inhibiting when the relationship between the outputs of the error identifying device and the error syndrome means indicate the data is correct of if the error syndrome means indicates that there are no errors.

The other objects, features and advantages of the present invention will become apparent from the following description taken in conjunction with the accompanying drawings through which the like references designate the same elements and parts.

DESCRIPTION OF THE PREFERRED EMBODIMENTS

An embodiment of this invention comprises an audio PCM recording and reproducing apparatus in which a conventional home rotary two heads type VTR is used and which need not be modified and an adaptor according to the invention is connected to it. Such PCM adaptor converts an audio PCM data to a signal format similar to a television signal format. A standard format is shown in FIG. 1 as discussed above.

Figure 1A:
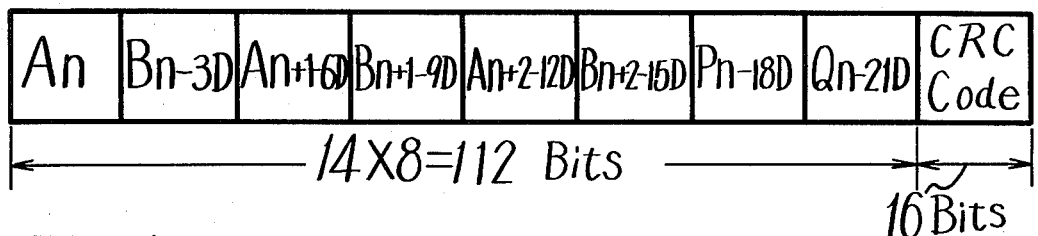
FIGS. 1A, 1B, 1C and 1D are diagrams showing plots of one block data and the waveform of a recording signal of one embodiment of this invention.
Figure 1B:
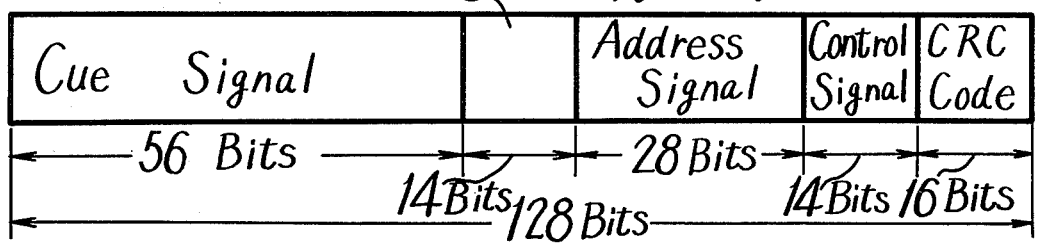

FIG. 1A illustrates a data block which is to be inserted into one horizontal interval (1H) and FIG. 1B illustrates a control block which is to be inserted to the prior horizontal interval 1H. Two channel audio signals are respectively sampled at a sampling frequency of $f_S = 44.056$ kHz and converted to data words $A_i$ and $B_i$ each comprising 14 bits. One block composes a PCM word of six words, two parity words $P_i$ and $Q_i$ for error correction and a CRC (Cyclic Redundancy Check) code of 16 bits so as to detect absence or presence of the mentioned data of a total eight words. Accordingly, the length of one block becomes 128 bits. The parity words $P_i$ and $Q_i$ for error correction are formed with respect to the PCM word of six words and are interleaved word by word. In FIG. 1A, suffixes attached to each word show the interleaving relationship where a unit delay time is represented by D (block). The control block seen in FIG. 1B comprises a cue signal of 56 bits, a content identifying signal of 14 bits, an address signal of 28 bits, a control signal of 14 bits and a CRC code of 16 bits for detecting errors.

Figure 1C:
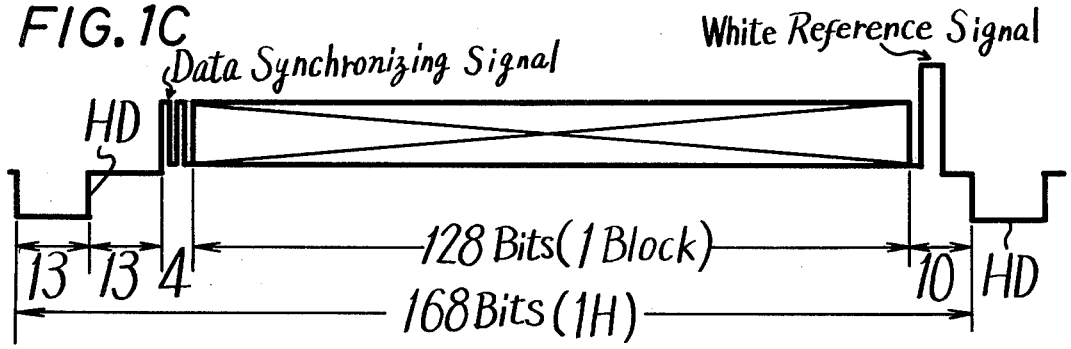
Figure 1D:
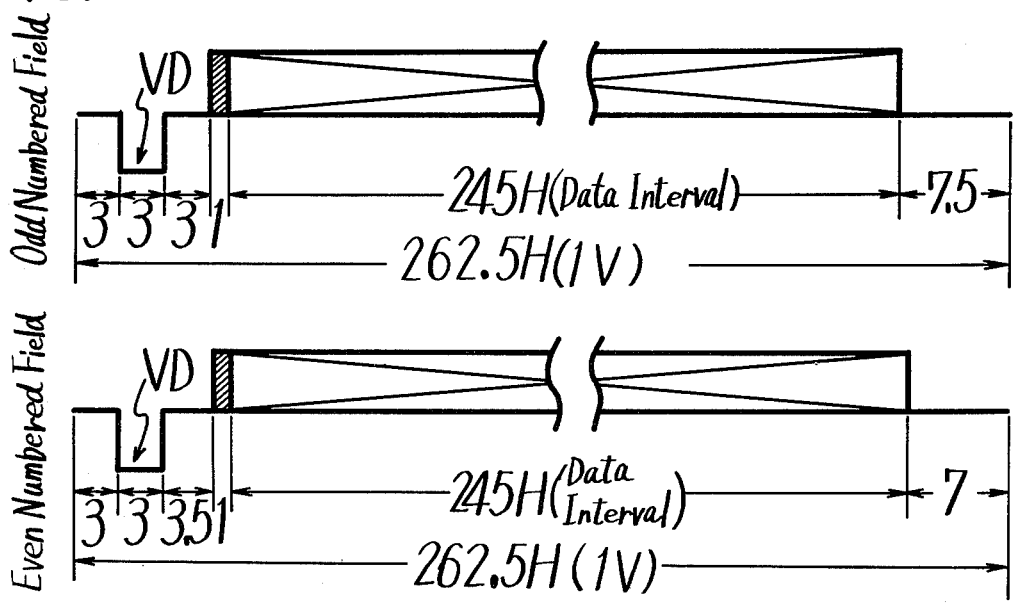

As illustrated in FIG. 1C, into 1H (168 bits) of a horizontal synchronizing signal HD is inserted one block of 128 bits. A data synchronizing signal is added to the front and a white reference signal is added to the rear. Also, as illustrated in FIG. 1D, the data interval is selected to be 245H excluding an equalizing pulse interval and a vertical synchronizing signal (VD) interval for a total of 9H in one field (1 V) (9.5H for an even-numbered field) and an interval of 7.5H (7H for an even-numbered field) and includes a head switching timing interval. As shown by the cross-hatched section of FIG. 1D, the control block is inserted into the first 1H.

Figure 2:
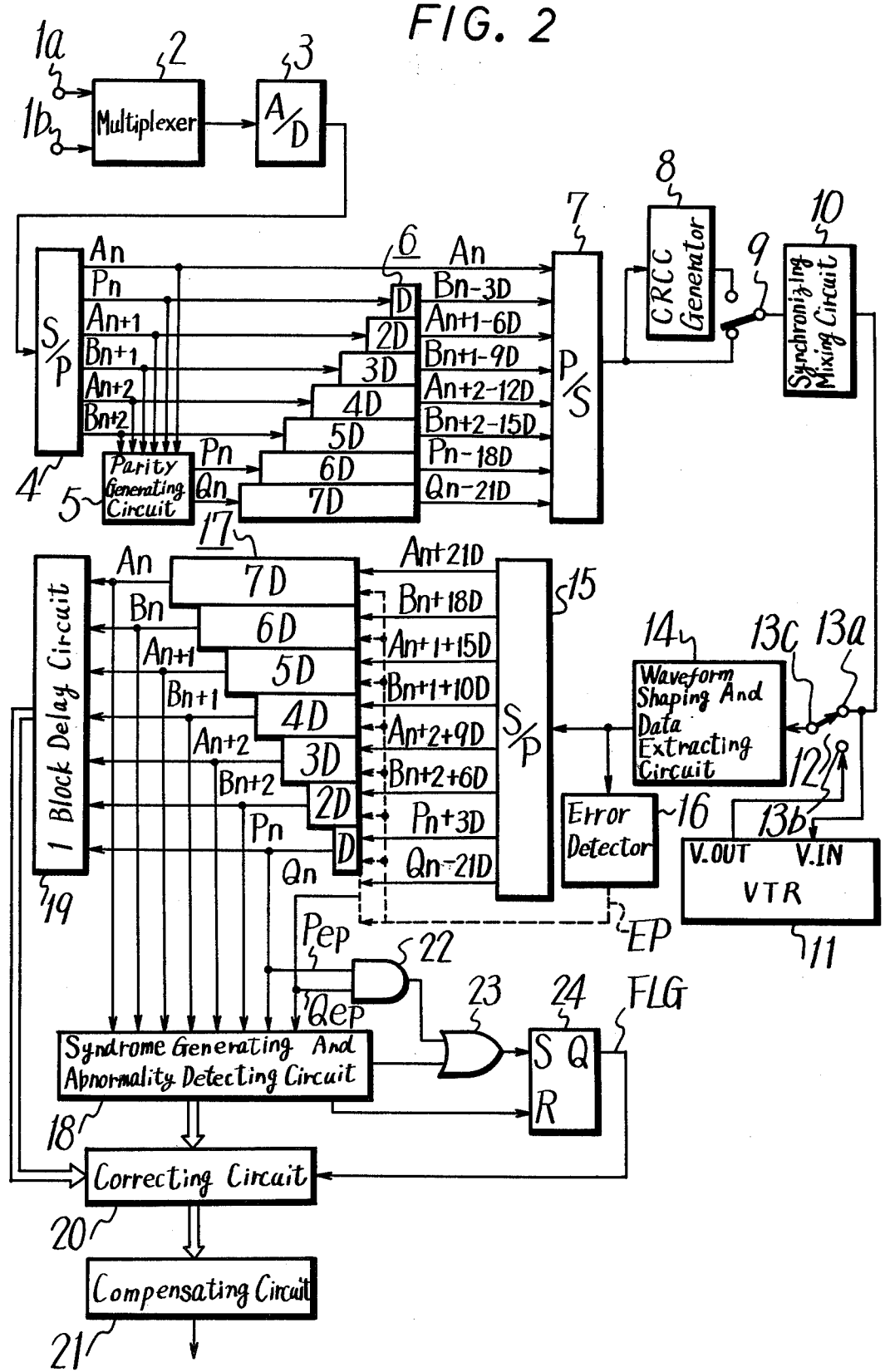
FIG. 2 is a block diagram showing an arrangement of a recording encoder and a reproducing decoder in one embodiment of this invention.

FIG. 2 illustrates the complete arrangement of the embodiment and includes a recording encoder and a reproducing decoder. To each of the input terminals 1a and 1b there are applied analog output signals of the A and B channels derived from a sample-and-hold circuit (not shown). Terminals 1a and 1b are connected to a multiplexer 2 which feeds an A/D (Analog to Digital) converter 3 and the signals are digitized with one sample forming one word. The output of the A/D converter 3 is supplied to a series-parallel converter 4 and converted to six parallel words. These six words are supplied to a parity generating circuit 5 and to an interleaving delay circuit 6. The parity generating circuit 5 produces the first and second parity words and operates as follows.

$$P_n = A_n \oplus B_n \oplus A_{n+1} \oplus B_{n+1} \oplus A_{n+2} \oplus B_{n+2}$$

$$Q_n = T^6 A_n \oplus T^5 B_n \oplus T^4 A_{n+1} \oplus T^3 B_{n+1} \oplus T^2 A_{n+2} \oplus T B_{n+2}$$

In the above equations, reference letter n denotes a multiple of either 0 or 3, $\oplus$ indicates a modulo 2 addition of each bit corresponding to each word and T represents a generating matrix. The first and second parity words can correct one word error within one block and if the position of the error word is known, two word errors can also be corrected. The delay circuit 6 is provided to delay the six PCM data series from the serial-parallel converter 4 and the two parity data series from the parity generating circuit 5 each by D of the unit delay time and times differ by D (0, D, 2D, 3D, 4D, 5D, 6D, 7D). In practice, a memory (RAM (Random access Memory)) is utilized for such delays. In other words, the write and read addresses of the memory are controlled so as to perform interleaving and the frequency of a read clock signal is raised to be higher than the frequency of a write clock signal so that the time-base is compressed to form a data blank corresponding to a vertical blanking period. The outputs of the delay circuit 6 is supplied to a parallel-series converter 7 and converted to word serial bits to which the CRC code is added by a CRC code generator 8 and a parallel switch 9. Data output signals are produced having the format shown in FIG. 1A. To such data output are added the synchronizing signal, the equalizing pulse and so forth by a synchronizing mixing circuit 10 so as to form a recording signal having the same signal configuration as the television signal shown in FIGS. 1C and 1D. This signal is supplied to a video input terminal of a VRT 11 and to one input terminal 13a of a switch 12.

A reproduced signal obtained at the video output terminal of the VTR 11 is applied to another input terminal 13b of switch 12. A signal produced at an output terminal 13c of the switch 12 is supplied to a waveform shaping and data extracting circuit 14 of the reproducing decoder. Although not shown, a synchronizing signal is separated from the reproduced signal and is utilized to form a timing pulse signal which is required for data processing by the reproducing system. The reproduced data from circuit 14 is supplied to a series-parallel converter 15 and to an error-detecting circuit

16. The error-detecting circuit 16 is provided to detect errors by utilizing the CRC code for each block of the reproduced data and produces an error indicator EP which is "1" if an error exists and "0" if no error exists. Eight words appearing at the output of the serial-parallel converter 15 such as $A_{n+21D}$, $B_{n+18D}$, $A_{n+1+15D}$, $B_{n+1+12D}$, $A_{n+2+9D}$, $B_{n+2+6D}$, $P_{n+3D}$ and $Q_n$ and these are supplied to a de-interleaving delay circuit 17 in which a delay (7D, 6D, 5D, 4D, 3D, 2D, D, 0) is applied so as to cancel the delay caused by the interleaving. In this case, the delay circuit 17 receives the error indicator signal EP as well as the data and the error indicator signal EP of one bit is added to each word of the data.

In practice, the delay circuit 17 is comprised of a memory in which addresses are controlled so as to add a predetermined delay and the frequency of the read clock signal is made lower than the frequency of the write clock signal so as to perform time-base extension. Data of $A_n$, $B_n$, $A_{n+1}$, $B_{n+1}$, $A_{n+2}$, $B_{n+2}$, $P_n$ and $Q_n$ de-interleaved by the delay circuit 17 together with the error indicator signals are supplied to a syndrome generating and abnormality detecting circuit 18 and is also supplied, through a one block delay circuit 19, to a correcting circuit 20. The correcting circuit 20 receives the syndromes signals which have been generated. An uncorrectable erroneous word is interpolated from the mean value in a compensating circuit 21 which is connected to the correcting circuit 20.

Error indicator signals Pep and Qep relative to two parity data are applied to an AND gate 22 and the output of the AND gate 22 and an abnormality detected signal from the syndrome generating and abnormality detecting circuit 18 are applied to an OR gate 23. The output of the OR gate 23 is supplied to a flip-flop 24 as the set input (S) and a normal detected signal from the syndrome generating and abnormality detecting circuit 18 is supplied to the flip-flop 24 at the reset input (R). A flag signal FLG generated by flip-flop 24 is supplied to the correcting circuit 20 as a control signal and when the FLG="1," the correcting circuit 20 is enable so as to correct an error.

Correction or compensation of an erroneous word is accomplished as follows. For the PCM data of one block to generate the parity words P and Q, six words, $W_1$ to $W_6$ may be considered. If six words $W_1$ to $W_6$ and the parity words P and Q are reproduced, by an operation as follows $$S_1 = P + \sum_{n=1}^{6} Wn = Pe \oplus \sum_{n=1}^{6} Wne$$

$$S_2 = Q + \sum_{n=1}^{6} T^{7-n}Wn = Qe \oplus \sum_{n=1}^{6} T^{7-n}Wne$$

where the reference letters Pe and Qe designate error patterns of the parity words P and Q with the error patterns for example, indicating the presence of error of each bit by "1" and an absence of error by "0" and Wne indicates an error pattern of the PCM word. Syndromes $S_1$ and $S_2$ are thus formed. If no error exists, $S_1=0$ and $S_2=0$. If only the parity word P is erroneous, $S_1 \neq 0$ and $S_2=0$. If only parity word Q is erroneous, $S_1=0$ and $S_2 \neq 0$. Further, if only two words of the parity words P and Q are erroneous or if one or more words of the PCM data words $W_1$ to $W_6$ are erroneous, $S_1 \neq 0$ and $S_2 \neq 0$. However, since error correction is not necessarily required for a case where only either the parity word P or Q is erroneous, description will be given for a case where the PCM word is erroneous.

1. For a one word error of the PCM word:
It can be expressed as $$\hat{W}i = Wi \oplus Wie$$

where
Wi: represents an erroneous word, $\hat{W}i$: represents a true value;
Wie: represents an error pattern.

1. a. If P is correct and the error position i is specified by the error indicator EP, since $$S_1 = \sum_{n=1}^{6} Wne = Wie$$

thus $$Wi = \hat{W}i \oplus S_1$$

1. b. If P is erroneous but Q is correct and the error position i is specified by the error indicator EP, since $$S_2 = \sum_{n=1}^{6} T^{7-n}Wne = T^{7-i}Wie$$

thus $$Wi = \hat{W}i \oplus Wie = \hat{W}i \oplus T^{i-7}S_2$$

1. c. If P and Q are correct but the erroneous word of one word error is unknown, the data word is the word error and if it be represented by $\hat{W}i$
thus $$S_1 = Wie$$

$$S_2 = T^{7-i}Wie$$

then the i to satisfy $$\therefore S_1 = T^{i-7}S_2 \text{ or } T^{7-i}S_1 = S_2$$

is searched. If the i is known, thus $$Wi = \hat{W}i \oplus S_1$$

2. If P and Q are correct but two words (Wi, Wj) of the PCM word are erroneous (where each error pattern is given as Wie and Wje), it can be expressed as follows.

$$\hat{W}i = Wi \oplus Wie, \quad \hat{W}j = Wj \oplus Wje$$

$$\begin{cases} S_1 = Wie \oplus Wje \\ S_2 = T^{7-i} Wie \oplus T^{7-j} Wje \end{cases}$$

$$\therefore Wje = (I \oplus T^{i-j})^{-1} (S_1 \oplus T^{i-7} S_2)$$

(where letter I denotes an unit matrix)

$$\therefore Wie = S_1 \oplus Wje$$

$$Wi = \hat{W}i \oplus Wie$$
$$= \hat{W}i \oplus S_1 \oplus (I \oplus T^{i-j})^{-1} (S_1 \oplus T^{i-7} S_2)$$

$$Wj = \hat{W}j \oplus Wje$$

-continued
$$= \hat{W}j \oplus (I \oplus T^{i-j})^{-1} (S_1 \oplus T^{i-7} S_2)$$

The correcting circuit 20 performs the error corrections described above. In other cases except the above the words identified as erroneous by the error indicator EP are compensated by the compensating circuit 21. However, as is the case described hereinafter, if the error position cannot be detected even when the presence of the error is known, such error is detected as an abnormality and an abnormality detecting output is produced so as to inhibit the correction operation and instead, to perform a compensation operation.

3. a. For a case wherein both P and Q are correct, but the erroneous word is unknown and also the error position i cannot be detected by the method of 1−C, for example, and there are two or more erroneous words though not specified by the error indicator.

3. b. For a case wherein P is correct, but Q is erroneous. Although the error indicator EP for each word of $W_1$ to $W_6$ does not specify the erroneous word, $S_1 \neq 0$ is established.

3. c. For a case wherein Q is correct, but P is erroneous. Although the error indicator EP for each word of $W_1$ to $W_6$ does not specify the erroneous word, $S_2 \neq 0$ is established.

Figure 3A:
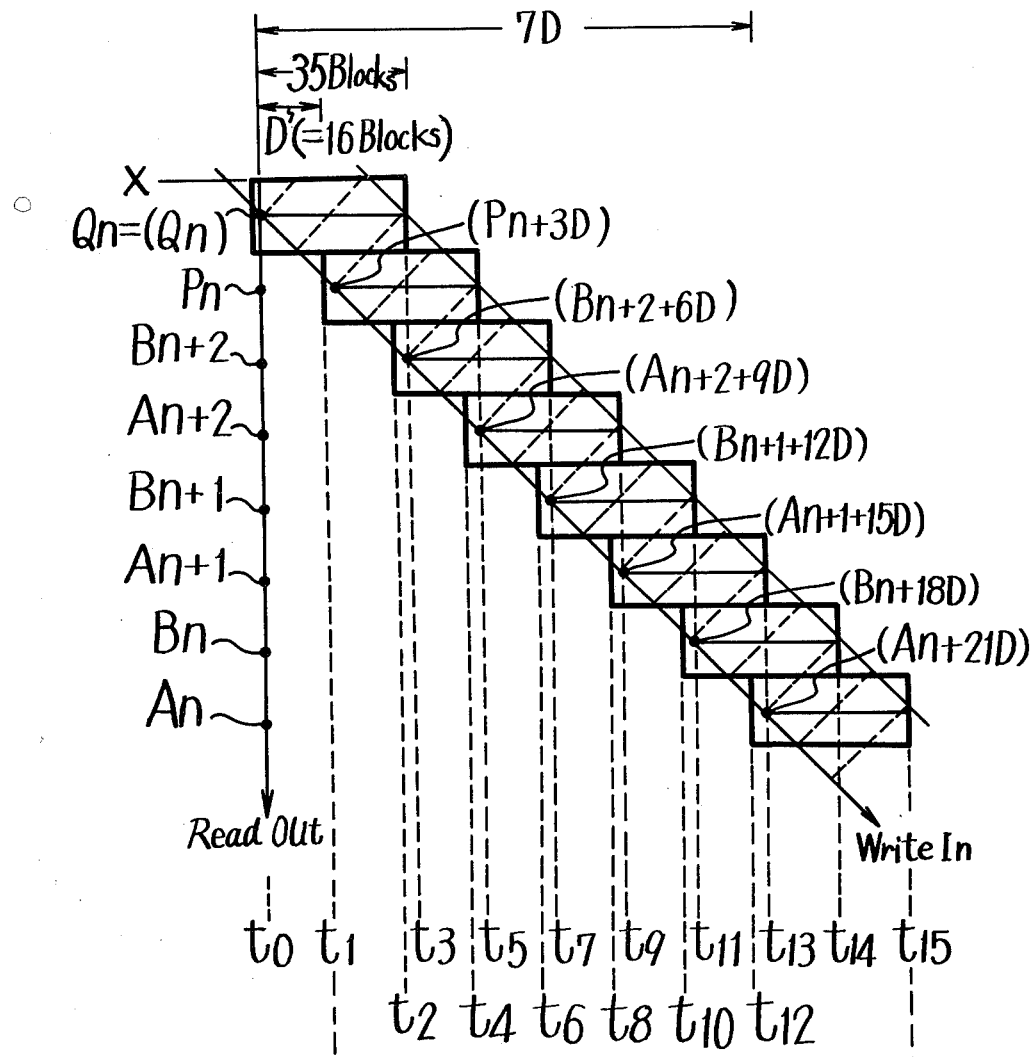
FIG. 3A and 3B are a schematic diagram useful for explaining the operation of one embodiment of this invention.
Figure 3B:
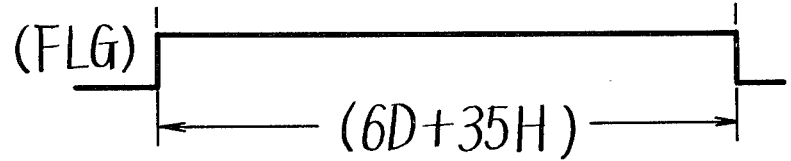

A further description of an embodiment of this invention where the switch 12 associated with VTR 11 is switched from the EE mode where the input terminal 13a is connected to the output terminal 13c to the reproducing mode where the input terminal 13b is connected to the output terminal 13c. In a memory area of the de-interleaving delay circuit 17 having memory, the reproduced data of one block are sequentially written word by word in each address spaced from each by D=16 blocks and with respect to the address of the same block, such data are sequentially read out word by word. As shown in FIG. 3A, when data $(A_{n+21D})$ $(B_{n+18D})$, . . . $(P_{n+3D})$ and $Q_n$ of a first block of the reproduced data just after the connection point X are written in, together with $(Q_n)$, i.e., $Q_n$, the reproduced data $A_n, B_n, \ldots P_n$ are read out. In this case, if a time beyond 2D after the data is switched is represented by d, for example, it is assumed that the burst error due to the dropout occurs during a period of 35 blocks. If so arranged, all write data, shown by a cross-hatch area in the Figure, included in the interval of 35H after the connection point X will be in error. If no error exists excluding the above-mentioned error, since the error is a one word error of the parity word Q during the interval $t_0$ to $t_1$, the reproduced data will be produced as is. If the timing becomes $t_1$, the error indicators Pep and Qep for the parity word de-interleaved become "1" simultaneously so that the output of the AND gate 22 will be "1" which will set the flip-flop 24 which will produce the flag signal FLG "1" as shown in FIG. 3B. By such a process, the correcting circuit 20 is inhibited from correcting the error and instead, it will compensate the erroneous word in the PCM word. In this embodiment of the invention, during the timing $T_{15}$ wherein no erroneous word is presented, the flip-flop 24 is reset and the flag signal FLG will be "0" so as to discontinue inhibiting of the error correction circuit. An absence of an error word can be detected due to the fact that two syndromes $S_1$ and $S_2$ together are represented by "0". On the other hand, to detect the normal state during the timing $t_{14}$ wherein a position of the erroneous word which has been searched from the syndromes $S_1$ and $S_2$ by the method 1−C described above is made coincident with a position of one word error specified by the error indicator and the flag signal will be "0" according to such detection.

If the flag signal FLG does not occur thereby not to inhibit the correction operation, the correction or the compensation of the error will be performed as described below.

(1) During interval $t_0$ to $t_1$: Since the error is a one word error of the parity word Q, the PCM word is produced as it is.

(2) Interval $t_1$ to $t_2$: Since the error is a two word error of the parity data P and Q, the PCM word is produced as it is.

(3) Interval $t_2$ to $t_3$: Since the error is a total of three word errors of the parity words P and Q and one word of the PCM word, it becomes impossible to correct the errors and hence, the erroneous word of the PCM word is compensated.

(4) Interval $t_3$ to $t_4$: Since the error is a total of two word errors of the parity word P and one word of the PCM word and the parity word Q is correct, the correction is performed according to the method of 1−b previously described. However, due to correction employing different data, such correction will be erroneous.

(5) Interval $t_4$ to $t_5$: Since the error is in three words, two erroneous words of the PCM word are compensated.

(6) Intervals $t_5$ to $t_6$, $t_7$ to $t_8$, $t_9$ to $t_{10}$ and $t_{11}$ to $t_{12}$: Since the parity words P and Q are correct and the error is a two word error of the PCM word, the correction is performed according to the above-mentioned method 2. However, due to the employment of different data, the correction will be erroneous.

(7) Intervals $t_6$ to $t_7$, $t_8$ to $t_9$, $t_{10}$ to $t_{11}$ and $t_{12}$ to $t_{13}$: Since the error is a three word error, each erroneous word is compensated.

(8) Interval $t_{13}$ to $t_{14}$: Since the parity words P and Q are correct and the error is a two word error of the PCM word, the correction is performed according to the above described method 2. In this case, since data to be employed are all included in the reproduced data, the correction will correct the errors.

(9) Interval $t_{14}$ to $t_{15}$: Since the error is a one word error, the correction is carried out in accordance with the above-described method 1−a. The correction will correct the data.

For error correction this invention can prevent erroneous corrections in the intervals as shown by (4) and (6) from occurring. Only by the method for detecting the abnormal relationship between the error indicator and the syndrome, in other words, for detecting that the syndrome is not indicated by 0 although the erroneous word is not identified by the error indicator EP, since $S_1 = 0$ and $S_2 = 0$ are established as described above, it is not possible to prevent the erroneous correction from occurring in the interval where the erroneous word is identified by the error indicator EP. However, according to this invention, since the flag has already been displayed before the error indicators of all the parity words identify the erroneous words, the erroneous correction can be prevented positively and reliably. Further, when an burst error having a length d with the relationship $D < d < 2D$ occurs after the connection point of the different data, this invention provides an effective correction.

Although the invention has been described with respect to preferred embodiments, it is not to be so limited as changes and modifications can be made which are within the full intended scope of the invention as defined by the appended claims.

We claim as our invention:

1. Means for correcting a PCM signal comprising time interleaved binary data words and error correction and error detection words comprising, an error detecting circuit receiving the incoming PCM signal, a time de-interleaver means receiving the incoming PCM signal and separating it to a plurality of parallel binary data and error correction and error detection words, a syndrome and abnormal detecting circuit receiving the output of said time de-interleaver means, a data correcting circuit receiving inputs from said de-interleaver and said syndrome and abnormal detecting circuit, and including a flip-flop for producing a flag which is supplied to said data correcting circuit and receiving an input from said syndrome and abnormal detecting circuit.

2. Means for correcting a PCM signal according to claim 1 including gate means connected between de-interleaver and said syndrome and abnormal detecting circuit.

3. Means for correcting a PCM signal according to claim 2 wherein said gate means comprises an AND gate and an OR gate.

4. Means for correcting a PCM signal according to claim 1 wherein said time de-interleaver includes a series to parallel converter, and a time delay means for converting said PCM signal into a plurality of time delayed signal.

5. Means for correcting a PCM signal according to claim 4 including a one block delay circuit connected between said time delay means and said correcting circuit.

* * * * *